United States Patent [19]

Repik et al.

[11] 3,951,856

[45] *Apr. 20, 1976

[54] PROCESS FOR MAKING ACTIVATED CARBON FROM AGGLOMERATIVE COAL

[75] Inventors: Albert J. Repik, Charleston; Charles E. Miller, Mount Pleasant; Homer R. Johnson, Charleston, all of S.C.

[73] Assignee: Westvaco Corporation, New York, N.Y.

[ * ] Notice: The portion of the term of this patent subsequent to Oct. 22, 1991, has been disclaimed.

[22] Filed: Sept. 4, 1974

[21] Appl. No.: 503,483

Related U.S. Application Data

[63] Continuation-in-part of Ser. No. 294,468, Oct. 2, 1972, Pat. No. 3,843,559.

[52] U.S. Cl. ................................. 252/421; 48/210; 201/8; 201/9; 201/31; 201/38; 201/44; 252/445; 423/449
[51] Int. Cl.² ..................... B01J 31/10; B01J 21/18
[58] Field of Search ............... 252/421, 445; 201/9, 201/31; 208/48 Q, 127

[56] References Cited
UNITED STATES PATENTS
3,843,559   10/1974   Repick et al. ................ 252/421

*Primary Examiner*—Winston A. Douglas
*Assistant Examiner*—P. E. Konopka
*Attorney, Agent, or Firm*—Richard L. Schmalz; Ernest B. Lipscomb, III

[57] ABSTRACT

Fluidized bed technique for oxidizing normally agglomerative bituminous coal is disclosed. One high rank bituminous coal is prepared for activation by grinding, briquetting and crushing to the ¾ inch to 4 mesh size. Thereafter, the coal particles are fluidized in an oxygen containing atmosphere at from about 400°F. to 700°F. Water is preferably added during oxidation, controlling the oxidation temperature. In this manner, coal particles are rendered nonagglomerative which, when thereafter subjected to carbonization and activation, yields superior activated carbon.

6 Claims, 2 Drawing Figures

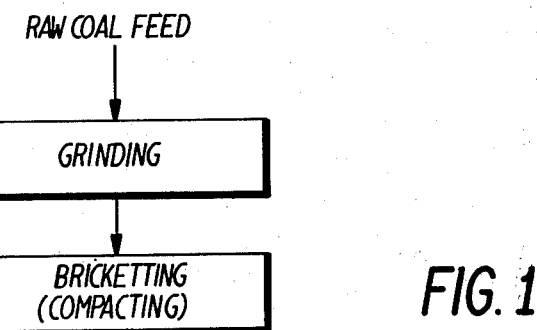
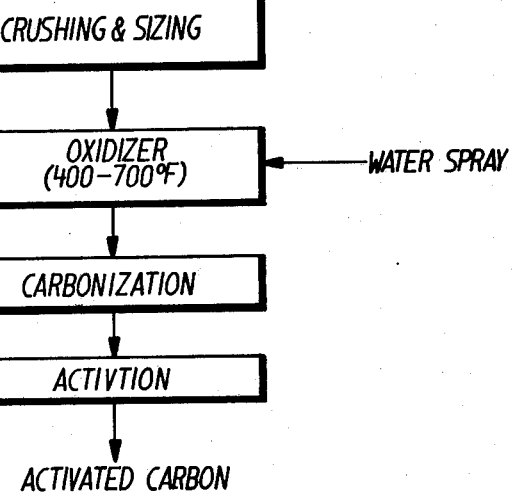
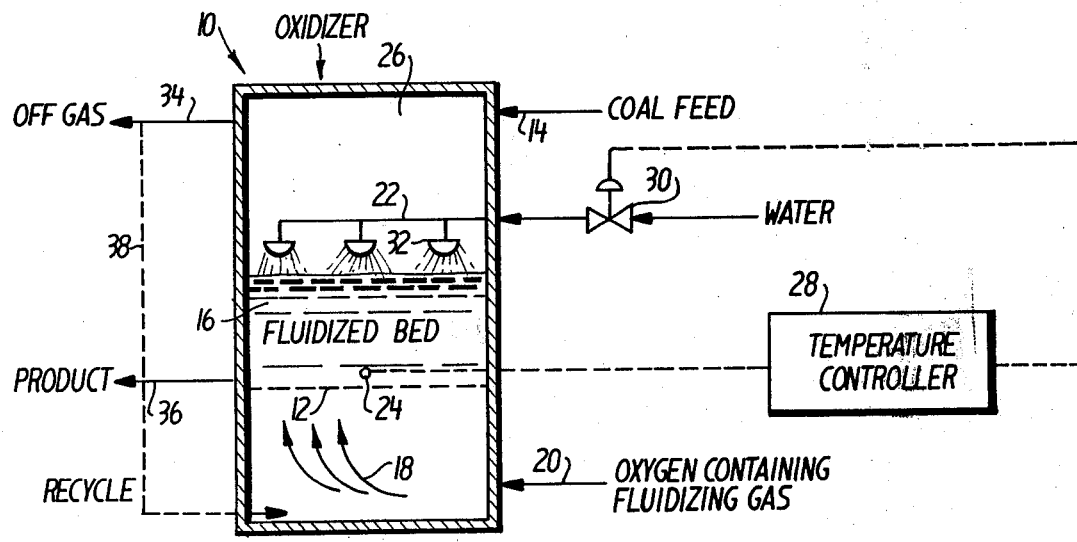

PROCESS FOR MAKING ACTIVATED CARBON FROM AGGLOMERATIVE COAL

CROSS-REFERENCE TO RELATED APPLICATION

This application is a continuation-in-part of co-pending U.S. application Ser. No. 294,468 filed Oct. 2, 1972, and now U.S. Pat. No. 3,843,559 which issued Oct. 22, 1974.

BACKGROUND OF THE INVENTION

1. Field of the Invention

This invention relates generally to an improved process for making activated carbon using a fluidized bed technique for conditioning coal particles preliminary to carbonization and final activation. According to this invention, the process employs an oxidation treatment of prepared coal particles in a reactor having means for maintaining close control of the oxidation temperature and average residence time.

2. Description of the Prior Art

Numerous techniques have been heretofore proposed for making activated carbon. As will be appreciated by those skilled in this area of technology, the particular route taken depends — to a great extent — on the nature of the starting material, the end product desired in relation to its industrial application. Typical starting materials include coconut shells, used cooking liquors from paper mills and coal. Thus, where coal has been used as a carbon source, it is the usual practice to prepare the coal by one or more of the following conventional steps, crushing, washing, compaching, and sizing. Thereafter, the coal particles are heated to an elevated temperature wherein the volatile matter is substantially driven off.

One suggested approach to making activated carbon resides in the use of an upright retort such as described in U.S. Pat. Nos. 2,536,782 and 2,536,105, both being issued to K. B. Stuart on Jan. 2, 1951. The Stuart apparatus, directed only to carbonization and activation, comprises an inlet at the top of the retort for ingress of carbonaceous material and an outlet at the bottom for egress of activated carbon, the retort being divided into an upper carbonizing chamber and a lower activating chamber with a partition disposed between the two chambers with at least one opening therein for the passage downwardly of char from the upper chamber to the lower chamber and for the passage upwardly of gases from the lower chamber to the upper chamber.

Another technique for activation resides in the use of a kiln, wherein a bed of carbonaceous material is continually agitated at elevated temperatures by mechanical stirrers or by providing a rotating kiln to expose the coal to the action of hot reactive gases. This technique is referred to in the text, *Activated Carbon* by J. W. Hassler, Chemical Publishing Co., Inc., NY 1963, at page 181.

After an extensive period of investigation, it was found advantageous to employ one or more fluidized bed reactors for oxidation under controlled temperature and controlled environmental conditions to make activated carbon from bituminous coal. Bituminous coal particles become plastic-like and stick together when heated to 800°F., or thereabouts depending on the nature of the coal used, its particle size, etc. This "agglomerative" effect — as it is commonly called — is caused for the most part by the presence of tars and other volatiles present in the raw coal. This undesirable agglomerative characteristic is particularly troublesome where fluidized bed reactors are employed. As particles clump and grow larger, the fluid reactor can become plugged and must be cleaned. Moreover, as the particles grow larger, it becomes more difficult to maintain the particles in a fluidized condition which is necessary for efficient reaction. To avoid this particular problem, various suggestions have been made. For example, in U.S. Pat. No. 3,047,472 to Gorin, crushed coal is oxidized first at about 600°F., followed by a second oxidation at a temperature in excess of 850°F. The U.S. Pat. No. 3,076,751 to Minet also discloses a process for making char and recovering volatiles from coal. In this process, however, it is noted that an inert gas is used in a first reactor maintained at a temperature which can be as high as 1,600°F. The patents to Eddinger et al., U.S. Pat. Nos. 3,375,175 and 3,565,766, disclose multi-stage fluidized bed processes for pyrolyzing bituminous coal to obtain increased yields of oils and tars. Inert gas is employed as the fluidizing medium in both the initial pretreatment and higher temperature pyrolysis with the oxidizing fluidizing medium employed in the latter partial gasification stage where the temperature is at least 1,500°F.

From the foregoing brief description of pertinent prior art methods, it is seen that fluidization treatment of coal has been utilized, but not in the context of making activated carbon having predetermined tailored properties. Moreover, although oxidation of fluidized carbonaceous particles has been suggested, as a practical matter, this approach has met with difficulty, at least up until this invention.

Various suggestions have been made for controlling the oxidation reaction temperature, principally for pretreatment prior to gasification process wherein there is minimum oxidation. These include:

1. varying the oxygen concentration of the fluidizing gas,
2. recycle of a portion of the oxidized product, and
3. immersion of cooling coils in the fluid bed.

Although the above-mentioned techniques provide some measure of temperature control, each suffers from disadvantages from a technical, as well as, commercial view point.

For instance, where the oxygen concentration is varied, a high degree of expensive, sophisticated analytical instrumentation is required. Moreover, this type of control tends to lag and does not have the best response to maintain proper, steady state conditions.

Where a portion of the oxidized product is withdrawn, cooled, and then returned to the fluidized bed to control the reaction temperature, as described in U.S. Pat. No. 2,560,478 to B. C. Roetheli, the oxidized coal recycle rate would have to be about 10 times larger than the feed rate in order to absorb the excess heat. Such high product recycle rate would result in a lower oxidized product yield because of attrition losses, particularly since the particle hardness is relatively low during the oxidation step.

Where the cooling coils are immersed in the fluidized bed to control the reaction temperature in the oxidation step, a considerably reduced throughput is obtained. Moreover, coils inside the bed would result in higher attrition losses thus decreasing the oxidized product yield. Cooling coils would also give wider variations in steady state operating temperature and slower response to upsets in operating parameter because of the lag time for heat transfer inherent in cooling coils.

Thus, it will be apparent from the description which follows that the process according to the present invention has successfully overcome the disadvantages of the prior art approaches in a most efficient and economic manner.

SUMMARY AND ADVANTAGES OF THE INVENTION

The present invention offers significant advantages over the prior art methods for making activated carbon. Moreover, the present invention overcomes the problems previously associated with oxidation of carbonaceous particles by injecting water, preferably as a spray, directly into the fluidized bed being oxidized. The coal particles are subjected to an oxidizing fluidizing gas at a temperature from about 400°F. to about 700°F., preferably about 500°F. to 600°F.

In the technique for making activated carbon according to the following steps:
  a. grinding high rank, raw bituminous coal;
  b. compacting the ground particles to briquettes;
  c. crushing the briquettes and sizing;
  d. oxidation to prevent agglomeration;
  e. carbonization; and
  f. activation,
the improvement comprising, crushing the briquettes to a size between ¾ inch and 4 mesh, preferably ½ inch to 4 mesh.

As earlier mentioned, the oxidation reaction which destroys the agglomerating tendency is strongly exothermic, which when coupled with the necessity for conducting the reaction within fairly narrow temperature limits, presents a severe temperature control problem. The method according to this invention uses the addition of water, preferably by direct injection, such as a spray, through nozzles positioned above the fluidized bed or within the bed. Water is added or sprayed at a controllable rate, preferably automatically, for absorbing excess heat and maintaining the oxidation reaction temperature within the desired limits. In addition to maintaining the desired reaction temperature, it is believed the presence of water has a beneficial effect on the rate of the oxidation reaction, particularly at the lower end of the temperature range. For example, batch operation at 500°F. for 20 minutes with an oxidizing gas containing 30% water vapor resulted in an oxidation number of 95; whereas, a reduction in water vapor content to 10% reduced the oxidation number to 1 for the same temperature and residence time. The advantages of the present method over a prior method used in oxidation of coal are as follows:

1. Fluidized bed gives oxidized product yield of 90–95% compared to 75–80% for one known rotary kiln.

2. Fluidized bed gives significantly less particle breakage during oxidation than does rotary kiln. Example: For nominal 12 × 40 mesh feed with average particle diameter of 1.30 mm., the average diameter of fluidized bed product was 1.26 mm. compared to 1.00 mm. for kiln product.

3. Fluidized bed installation requires less than half of the land space of an equivalent rotary kiln.

4. Fluidized bed unit has significantly higher throughput per unit volume, i.e., on the order of 16 lbs./hr.-ft.$^3$ reactor volume for fluidized bed compared to 4 lbs./hr.-ft.$^3$ kiln volume for rotary kiln.

5. The present invention offers improved operational reliability due to mechanical and/or instrumental simplicity and greater flexibility, faster response time and greater stability, especially after an upset in conditions.

6. No external fuel required with fluidized bed once oxidation is initiated.

The inherent differences between fluidized bed and rotary kiln also should be mentioned.

a. The heat released by the exothermic oxidation reaction/unit volume bed is about 50,000 BTU/hr.-ft.$^3$ bed for fluidized bed oxidation compared to about 20,000 BTU/hr.-ft.$^3$ bed for rotary kiln oxidation.

b. The exothermic heat is removed in the fluidized bed principally by vaporization of $H_2O$; whereas, in the rotary kiln the exothermic heat is removed principally by the oxidizing gas.

c. The product particles from fluidized bed oxidation remain in the reactor for varying lengths of time which is characteristic of back mix flow. Control of residence time, as well as, throughput in the fluidized bed may be assisted by insertion of baffles to minimize back mix flow, or the use of staging. In a rotary kiln, the particles remain in the kiln for the same length of time which is characteristic of plug flow. As a result of the residence time distribution of the particles in the fluidized bed, the amount of oxygen reacted to reach a given oxidation level as defined by an oxidation test is about 2.5 times that required in a kiln (0.25 lb.$O_2$/lb. coal feed vs. 0.1 lb.$O_2$/lb. coal). As a result of the high oxygen consumption in the fluidizing bed unit, a majority (about 80%) of the particles are completely oxidized with the remaining particles having differing but lower levels of oxidation. The resulting oxidation achieved in the fluidizing bed unit is more desirable, as indicated by the production of a superior activated product. For example, fluid bed oxidation gives a 10–20% increase in Iodine Number (which is related to internal surface of the particles area) of the activated product over rotary kiln oxidation.

Studies indicate that the method according to the present invention provides oxidation temperature control within ±5°F. of the desired temperature. The control system functions effectively for both steady-state and for non-steady state operation such as at start-up, shutdown, and upsets in the process variables. This close control is achieved even where the process variables are widely ranged. These variables include feed throughput, feed particle size distribution, oxygen concentration of the fluidizing gas, bed temperature, inlet temperature of the fluidizing gas, fluidized bed depth and fluidizing velocity.

It will, therefore, be appreciated that the foregoing advantages offer significant technical, as well as, economic benefits over conventional processes for making activated carbon.

BRIEF DESCRIPTION OF THE DRAWING

Having briefly described the present invention, reference is now made to the drawing and the more detailed description of preferred embodiments which follow, in which:

FIG. 1 is a block diagram illustrating the overall process for making activated carbon according to this invention; and FIG. 2 is a more detailed schematic illustration of the oxidation step shown in FIG. 1 wherein coal particles are treated in a fluidized bed reactor with means for injecting water to control the reaction temperature.

DETAILED DESCRIPTION OF PREFERRED EMBODIMENTS

Referring to FIG. 1, it is seen that the process according to the present invention is particularly well suited for making granular activated carbon. The feed coal found to be most desirable for making activated carbon according to the process of this invention is referred to as high rank, medium volatile, strongly caking bituminous coal. Typically, such coals, according to A.S.T.M. classification, contain about 70% dry fixed carbon and about 30% dry volatile matter. Reference is made to the book, *Chemistry of Coal Utilization*, by Lowry, Chap. 2, (John Wiley and Sons, N. Y., 1945) for a more complete description of the various coal classification systems.

Coal, preferably high rank, medium volatile, strongly caking, bituminous coal, is first ground to a nominal 100–325 mesh, preferably at least 85% smaller than 100 mesh with 50–75% smaller than 325 mesh, (U.S. Sieve Series, Standard) using conventional milling equipment. The coal is then compacted using conventional briquetting apparatus such as a roll press, hydraulic press or the like into regularly shaped porous blocks having approximate equivalent diameters from 10 inches to 1 inch. In circumstances where the raw coal does not have the requisite porosity, compacting is used to accomplish this and may impart a tenfold increase in porosity over the coal as received from the mines.

The compacted coal is then crushed and sized to yield particles of a particle size ranging from a nominal size of about 3/4 inch to about 4 mesh. The foregoing grinding, briquetting and crushing steps are designed to prepare the coal for oxidation by imparting a preferred porosity of 0.05 cc./gm. to 0.20 cc./gm. as measured by mercury porosimetry for pores with diameters greater than 200 A., so that the finally obtained activated carbon product will have the desired properties.

The coal particles are thereafter oxidized in a fluidized condition in a manner described in greater detail hereinafter. Oxygen-containing fluidizing gas at a temperature ranging from about 400°F. to about 700°F., and preferably at between 500°F. to 600°F., is employed to alter organic substances in the coal thereby rendering the particles non-agglomerative. The average residence time during oxidation is up to about 2 hours, usually 10 minutes to 1 hour. The more severe temperatures, e.g., above 700°F., may result in destruction of the characteristic particle shape and particle fusion.

Thereafter, carbonization of the oxidized coal particles may be carried out also using fluidized bed or rotary kiln techniques at temperatures generally ranging from about 1,000°F. to about 1,200°F. The major part of the remaining organic material in the carbonaceous structure is removed under an inert atmosphere rendering the structure more suitable for activation. Activation is carried out at about 1,650°–1,950°F. with steam or a suitable oxygen-containing gas as the activating agent. The gasified combustible materials may be recovered, if desired. The gasified combustible materials including both organic materials such as carbon monoxide, methane and other hydrocarbons, as well as hydrogen, may be recovered and used as such or converted to other combustible materials such as synthesis gas. Although the precise mechanisms for activation and gasification are not fully understood, the result of such a procedure is to substantially increase the porosity and surface area of the carbon rendering the structure highly adsorptive.

Now referring to FIG. 2, where the oxidation according to the present invention is schematically illustrated in greater detail than shown in FIG. 1, thus, it will be seen that the prepared coal feed is introduced at a controlled rate into the fluidized reactor 10 above support plate 12. The coal feed is metered from a hopper (not shown) into a screw conveyor (not shown) which discharges through line 14 into bed 16. The fluidizing medium designated as 18 is an oxidizing fluid, preferably oxygen-containing gas, which enters the reactor 10 through line 20 located below the perforated support plate 12. The percentage of oxygen in the fluidizing gas is critical and related to throughput. Therefore, it can be widely varied, e.g., from about 1% by volume to about 50%. As oxygen concentrations increase, the potential for causing fire as a result of too rapid oxidation increase. Good results have been obtained with gases containing from about 10%–25% oxygen, by volume. For economy reasons, air is employed (20.8% oxygen) although mixtures with lesser or greater concentrations of oxygen can also be used.

The bed temperature of the fluidized bed 16 is easily maintained at 550°F. ±5°F. by a water spray 22 positioned in the reactor 10 above the fluidized bed 16 or may be sprayed directly into the bed. Automatic temperature sensing means, e.g., thermocouple 24 is preferably disposed in the fluidized bed 16 for fast response although it could also be positioned in the space 26 above the bed 16. Exothermal heat which is liberated during the oxidation of the fluidized particles is effectively removed by the addition of cooling water via header 22. The thermocouple 24 is connected to a temperature controller 28 which actuates the water inlet valve 30. Electrical or pneumatic means can be used to position valve 30. Alternatively, valve 30 can be manually controlled, if desired. It has been found that the direct injection of liquid water into the solid/gas mixture in the reactor 10 is extremely effective in controlling the reaction temperature. This results from the high rate of heat transfer between the liquid injected and the solid/gas mixture and the relatively high heat requirement for vaporization of water (about 1,000 BTU/lb.). Moreover, by using such direct cooling method, substantial economies can be effected. This includes lower capital investment and operating costs. Expensive heat exchange devices can be eliminated. By directly injecting water, the reaction temperature can be kept within ±5° of the desired temperature. Spray cooling using a plurality of spray nozzles 32 is the preferred injection technique because of its faster response, better control and the like.

For a particular compacted coal, a bed temperature range of from about 400°F. to about 700°F. was employed with good success. Above 700°F., particle agglomeration begins to become a problem; and below 400°F., the oxidation rate falls off rapidly. The 500°F. to 600°F. temperature range is preferred.

The average residence time required of the coal particles in the reactor can vary widely depending on such factors as the type of coal employed, the percentage of oxygen in the fluidizing medium, the moisture content and the like. Generally, an average residence time of up to one hour or more is sufficient to achieve the desired results. Thus, for example, coal particles leaving the fluid reactor 10 have an oxygen pickup value ranging from about 0.1 to about 0.50 pounds oxygen per pound of coal with an Oxidation Number of 85 or more signifying acceptable destruction of its agglomerating tendency. The oxygen pickup value signifies the amount of oxygen consumed by reaction and absorption. The Oxidation Number is herein defined as the percent of original sample in the particle size interval passing through the larger screen size after rapidly heating to 1,850°F., in the absence of air, in a Hoskins furnace.

After contacting the coal particles in the bed 16, the fluidizing gases are directed out of the reactor 10 through line 34 as an "off-gas." The off-gas can be recovered and reused or discarded by burning or the like. A cyclone separator (not shown) can be added to remove particulate matter prior to its discharge or further reuse.

For economical reasons, the off-gas can be recycled back to the reactor inlet, through line 38, shown dotted. In this manner, except for start-up, all heat requirements are supplied by the exothermic heat of oxidation by recycling the exhaust gases. During start-up, no recycle gases will be available to furnish heat to reach operating temperatures. Therefore, an external source of the hot inert gases is required for blending with the fluidizing gas to obtain gases at 500°F. or more. The oxidized product leaves the reactor 10 through line 36 where it can be recovered for further processing, as earlier described.

Having described the invention in general terms, the following example is set forth with reference to the drawing to more particularly illustrate the invention. This example is not meant to be limiting.

EXAMPLE 1

A. Briquetted bituminous coal was sized to ½ inch × 4 mesh and subsequently oxidized according to the present invention in a pilot plant steel fluidized bed reactor under the following operation conditions:

| Coal Feed | 1/2 Inch × 4 Mesh Compacted Coal |
|---|---|
| Feed Rate | 300 Grams Batch Charge |
| Fluidizing Gas | Air |
| Bed Temperature | 550°F. |
| Residence Time | 20 Minutes |
| Water Injection | Controlled to Maintain Bed Temperature at 550°F. |
| The Oxidized Product had the Following Characteristics | |
| Product Oxidation Number | 87 |
| Product Apparent Density | 44 (lbs./ft.³) |
| Product Yield | 94% |

The oxidized granular particles which emerged from the reactor shown in FIG. 2 were found to have good physical and non-agglomerating characteristics. It should be noted that an Oxidation Number of 87 signifies acceptable non-agglomerative properties and is equivalent to a Free-Swelling Index of zero according to A.S.T.M. Designation D-720-46. By comparison, the starting bituminous coal had a Free-Swelling Index of 9.

B. The oxidized, non-agglomerating particles were then subjected to carbonization and activation treatment in conventional equipment at conventional conditions. The resulting activated carbon product had the following physical characteristics:

| Nominal Particle Size: | 1/2 inch × 6 mesh |
|---|---|
| Density: | 33.5 lb./ft.³ |
| Iodine No.[1]: | 991 |

Note: [1]Milligrams of Iodine adsorbed per gram carbon at residual filtrate concentration of 0.02N.

It should be appreciated that the present invention is not to be construed as being limited by the illustrative embodiments. It is possible to produce still other embodiments without department from the inventive concepts herein disclosed. Such embodiments are within the ability of one skilled in the art.

What is claimed is:

1. In a process for treating high rank, medium volatile bituminous coal consisting essentially of, preparing said coal for oxidizing by grinding, briquetting said ground coal, crushing said briquettes, fluidizing said prepared coal particles with a gas containing from about 1% to about 50% oxygen at a temperature from about 400°F. to about 700°F. until the Oxidation Number is at least 85, injecting water into said fluidized coal particles to control the temperature, carbonizing said oxidized coal at a temperature in the range of about 1,000°F. to about 1,200°F., and activating said oxidized-carbonized coal with an activating gas from the group consisting of steam and an oxygen containing gas at a temperature in the range of about 1,650°F. to about 1,950°F., the improvement comprising, crushing said briquettes to a particle size from about ¾ inch to 4 mesh.

2. The process according to claim 1 wherein said oxidizing gas is air.

3. The process according to claim 1 wherein the oxidizing temperature is maintained at from about 500°F. to about 600°F.

4. The process according to claim 3 wherein the oxidizing temperature is controlled with said water to the desired temperature within the range of 500°F. and 600°F.

5. The process according to claim 1 wherein the particle average residence time during oxidation is up to about 2 hours.

6. The process according to claim 5 wherein the particle average residence time during oxidation ranges from 10 minutes to 1 hour.

* * * * *